(12) United States Patent
Cernasov

(10) Patent No.: US 7,474,470 B2
(45) Date of Patent: Jan. 6, 2009

(54) DEVICES AND METHODS FOR REDIRECTING LIGHT

(75) Inventor: Andrei Cernasov, Ringwood, NJ (US)

(73) Assignee: Honeywell International Inc., Morristown, NJ (US)

(*) Notice: Subject to any disclaimer, the term of this patent is extended or adjusted under 35 U.S.C. 154(b) by 222 days.

(21) Appl. No.: 11/302,173

(22) Filed: Dec. 14, 2005

(65) Prior Publication Data

US 2007/0133079 A1    Jun. 14, 2007

(51) Int. Cl.
  G02B 1/08  (2006.01)
  G02B 5/06  (2006.01)
(52) U.S. Cl. ............... 359/665; 359/666; 359/832
(58) Field of Classification Search ......... 359/665–666, 359/832
  See application file for complete search history.

(56) References Cited

U.S. PATENT DOCUMENTS

| | | | |
|---|---|---|---|
| 5,280,371 A | 1/1994 | McCartney, Jr. et al. | |
| 5,303,322 A | 4/1994 | Winston et al. | |
| 6,369,954 B1 | 4/2002 | Berge et al. | |
| 6,538,823 B2 | 3/2003 | Kroupenkine et al. | |
| 6,545,815 B2 | 4/2003 | Kroupenkine et al. | |
| 6,545,816 B1 | 4/2003 | Kroupenkine et al. | |
| 6,603,444 B1 | 8/2003 | Kawanami et al. | |
| 6,618,206 B2 | 9/2003 | Tarakci et al. | |
| 6,661,558 B2 | 12/2003 | Toor et al. | |
| 6,674,940 B2 | 1/2004 | Kroupenkine | |
| 6,702,483 B2 | 3/2004 | Tsuboi et al. | |
| 6,778,328 B1 | 8/2004 | Aizenberg et al. | |
| 6,806,988 B2 | 10/2004 | Onuki et al. | |
| 6,829,415 B2 | 12/2004 | Kroupenkine et al. | |
| 6,847,493 B1 | 1/2005 | Davis et al. | |
| 2002/0196558 A1 | 12/2002 | Kroupenkine et al. | |
| 2003/0048541 A1 | 3/2003 | Kroupenkine et al. | |
| 2003/0085850 A1* | 5/2003 | Feenstra et al. ............... 345/32 |
| 2003/0202256 A1 | 10/2003 | Bao et al. | |
| 2003/0206351 A1 | 11/2003 | Kroupenkine | |
| 2003/0227100 A1 | 12/2003 | Chandross et al. | |
| 2005/0002112 A1 | 1/2005 | Kroupenkine | |

(Continued)

OTHER PUBLICATIONS

Computer printout of Vikuiti™ Image Directing Film (IDF) II brochure obtained from http://products3.3m.com/catalog/us/en001/electronics_mfg/vikuiti/node_FOS40PZM69be/root_GST1T4S9TCgv/vroot_S6Q2FD9X0Jge/gvel_Z1R2XB443Hgl/theme_us_vikuiti_3_0/command_AbcPageHandler/output_html, 2 pages, 2002.

(Continued)

Primary Examiner—Jordan M. Schwartz
Assistant Examiner—James C Jones
(74) Attorney, Agent, or Firm—Ingrassia Fisher & Lorenz, P.C.

(57) ABSTRACT

A device for redirecting light may comprise a plurality of liquid prisms configured to transmit incident light from an image display element. The liquid prisms may be configured to selectively modulate a direction of the transmitted light relative to the incident light so as to selectively alter an angle at which an image generated by the image display element is projected to an observer. A method for redirecting light may comprise transmitting incident light from an image display element through a plurality of liquid prisms and selectively modulating a direction of the transmitted light relative to the incident light so as to selectively alter an angle at which an image generated by the image display element is projected to an observer.

25 Claims, 7 Drawing Sheets

U.S. PATENT DOCUMENTS

2005/0088754 A9    4/2005    Kroupenkine
2005/0113912 A1    5/2005    Feenstra et al.
2005/0253779 A1*    11/2005    Feenstra et al. ............... 345/6
2006/0079728 A1*    4/2006    Kuiper et al. ................. 600/9
2006/0245072 A1*    11/2006    Venema ..................... 359/666
2007/0153399 A1*    7/2007    Hendriks et al. ............ 359/666

OTHER PUBLICATIONS

Hantronix, "An Explantation of LCD Viewing Angle," *Application Note: Crystal Clear an Visibly Superior LCD Modules*, 2 pages, 2000.

* cited by examiner

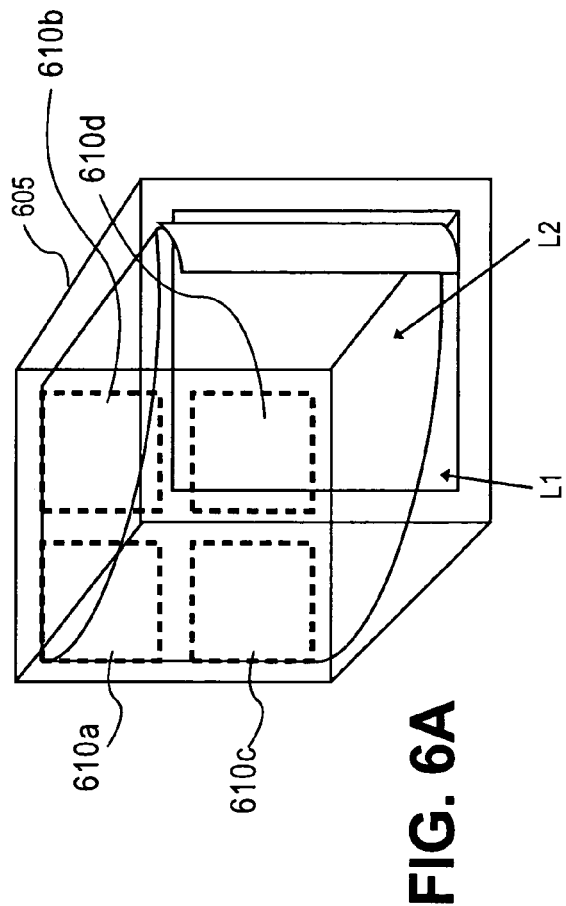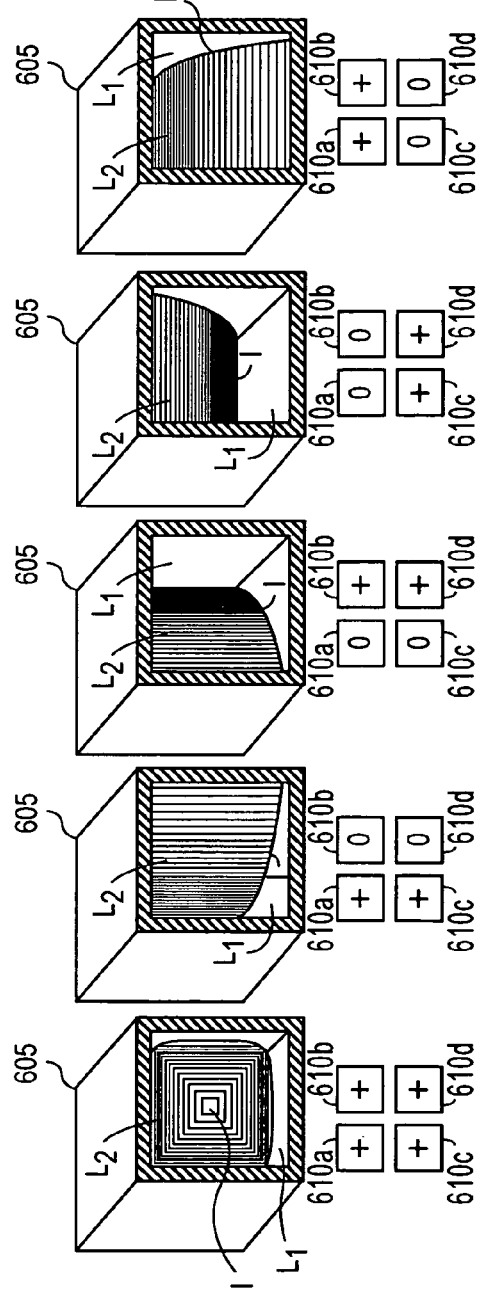

DEVICES AND METHODS FOR REDIRECTING LIGHT

TECHNICAL FIELD

This invention relates to devices and methods for redirecting light. In particular, this invention relates to tunable devices and methods for redirecting light from, for example, image display elements, including, but not limited to, electronic image display elements, such as, for example, liquid crystal display elements, plasma display elements, cathode ray tube display elements, and projection type display elements and/or from light sources, such as, for example, light emitting diodes (LED), organic light emitting diodes (OLED), incandescent, and/or electromechanical light sources.

BACKGROUND

Light redirection devices may be used in conjunction with image display elements, including, but not limited to liquid crystal display (LCD) panels, to redirect light from the image display element in a predetermined direction so as to project an image in a predetermined direction, for example, toward a viewer of the display element. For example, such light redirection devices may be used in aeronautical settings to redirect light, and thus an image generated by a LCD panel, from the LCD panel toward a pilot in the airplane's cockpit.

One conventional light redirection device includes a film comprising a transparent optical composite forming a series of micro-replicated prismatic structures. The film is configured to receive an input image (e.g., light from an LCD panel) and redirect the input image at a predetermined viewing angle. The predetermined viewing angle at which the light redirection film redirects the light is a fixed angle depending on the configuration of the prismatic structures of the film. Such conventional light redirection films therefore do not permit an observer of the image projected by the LCD panel to selectively modulate the angle at which the light (image) is redirected. Rather, the film configuration dictates the fixed angle at which light will be redirected, as opposed to a user being able to adjust that redirection angle, and thus the angle at which an image is projected, as desired.

It may therefore be desirable to provide light redirection devices and methods that permit the angle at which the image is projected to be adjusted by a user, such as an observer desiring to view the image projected. In other words, it may be desirable to provide tunable (e.g., selectively modulatable) light redirection devices and methods. In this way, a viewer, such as a pilot in a cockpit or individual in an automobile, for example, may adjust the angle at which the light from an image display element, such as, a LCD panel, for example, is transmitted so as to obtain an image that is optimally projected toward the location of the viewer. Further, it may be desirable to provide light redirection devices and methods that redirect light in two dimensions.

It also may be desirable to provide light redirection devices and methods that are programmable and/or automated.

It may further be desirable to provide a light redirection device that does not require moving, mechanical parts to achieve redirection of the light. Also, it may be desirable to provide such a light redirection device that substantially resists wear.

Moreover, it may be desirable to provide light redirection methods and devices that are capable of projecting a three-dimensional image.

SUMMARY

Exemplary embodiments according to aspects of the present invention may satisfy one or more of the above-mentioned desirable features set forth above. Other features and advantages will become apparent from the detailed description which follows.

According to an exemplary embodiment, as broadly described herein, a device for redirecting light may comprise a plurality of liquid prisms configured to transmit incident light from an image display element. The liquid prisms may be configured to selectively modulate a direction of the transmitted light relative to the incident light so as to selectively alter an angle at which an image generated by the image display element is projected to an observer.

Another exemplary embodiment may include a display system comprising an image display element in combination with a device as set forth above.

Yet another exemplary embodiment may include a method for redirecting light comprising transmitting incident light from an image display element through a plurality of liquid prisms and selectively modulating a direction of the transmitted light relative to the incident light so as to selectively alter an angle at which an image generated by the image display element is projected to an observer.

As used herein, "selectively modulate" may refer to the ability to transmit light at an angle, chosen as desired from among a range of angles, relative to the incident light. In other words, devices and methods that selectively modulate the direction of the transmitted light may be tunable such that a desired transmission (redirection) angle may be selected by an individual from among a range of transmission angles and the transmission angle may be adjusted accordingly. Thus, in contrast to some conventional light redirection devices and methods, light redirection devices and methods capable of selectively modulating a direction of transmitted light do not have a predetermined, fixed angle of transmission that is a function of a particular configuration.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The drawings of this application illustrate exemplary embodiments and together with the description, serve to explain certain principles. In the drawings:

FIGS. 6A-6F are schematic views of an enclosure of a light redirection device according to another exemplary embodiment.

DETAILED DESCRIPTION

Figure 1:
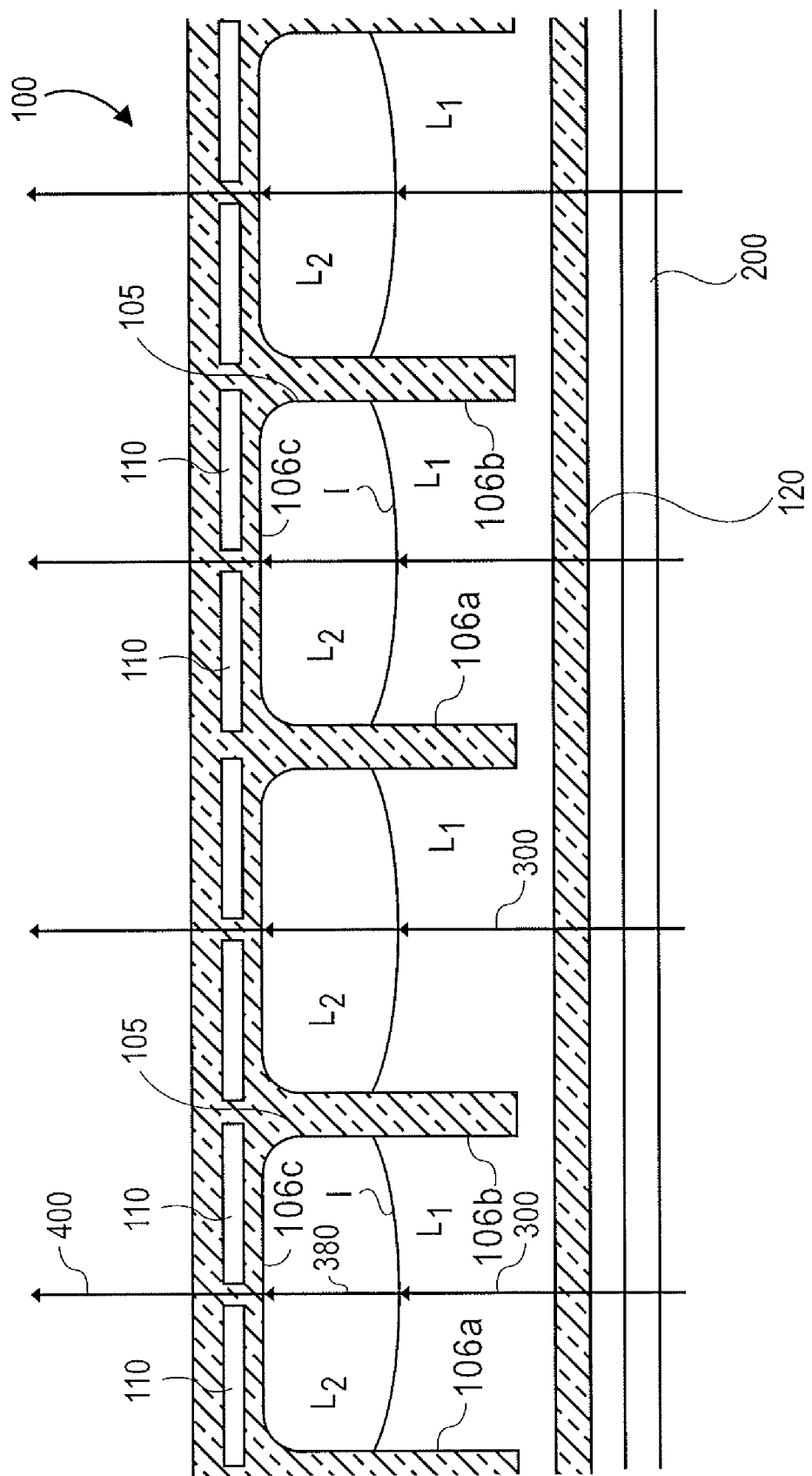
FIG. 1 is a partial, schematic side view of an exemplary embodiment of a light redirection device.

Light redirection devices and methods in accordance with exemplary embodiments may be used in conjunction with an image display element, such as, for example, a LCD panel, a cathode ray tube display element, a plasma display element, a projection display element, and/or other image display elements or light sources, such as, those using LEDs, OLEDs, incandescent, and/or electromechanical light sources to adjust the angle at which the image from the image display element is projected to a viewer. By adjusting the angle at which an image is displayed to a viewer, the light redirection devices and methods according to various exemplary embodiments may conserve display power since the image is directed only where it is desired to be viewed. Such conservation may be important in battery powered systems, aeronautical settings, and other settings in which minimizing power may be important. According to various exemplary embodiments, the light redirection devices and methods disclosed herein are configured to provide adjustability of the angle at which light is redirected so as to optimize viewing of the image generated by an image display element at an off-normal axis position relative to the image display element. By way of example, light redirection devices and methods according to various exemplary aspects of the invention may be useful in conjunction with an image display element, for example, a LCD panel provided within an interior of an automobile, military vehicle, or an airplane cockpit so as to permit a driver or passenger in an automobile or military vehicle, or a pilot in a cockpit, to selectively adjust (modulate) the angle at which an image is projected, which may optimize viewing of the image. Moreover, by optimizing the direction at which an image is projected, light redirection devices may be useful in relatively bright environments, such as in aeronautical settings, vehicle settings, date display applications, etc., such that substantially all of the display power is delivered to the viewer, thus making the image appear brighter.

In some settings, viewers of the image display element often may be positioned at an off-normal axis angle relative to the image display element (e.g., the viewers may be positioned at an angle to the direction at which the image display element projects an image). Therefore, such viewers may not be able to view the image from the image display element or may have an impaired view of the image. By utilizing the light redirection devices and methods according to exemplary embodiments, a viewer may be able to redirect light from the image display element at an angle relative to a direction of incident light from the image display element. Such redirection may enhance the viewer's ability to view the image generated by the image display element. Further, since different viewers that may need to view the image display element may be positioned differently relative to the image display element, the light redirection devices and methods according to exemplary embodiments may permit light to be redirected at a range of angles, and may be capable of permitting viewers to tune (modulate) the angle at which the light is redirected so as to be able to project an image at a desirable angle and optimize viewing.

To achieve such tuning and adjustability of the viewing angle, various exemplary embodiments according to the invention may employ liquid optics principles and electrokinetic and/or electrostatic principles. By transmitting light from an image display element through a plurality of liquid prisms and altering a liquid interface through which the light passes, the direction at which light transmitted from the interface may be modulated relative to the direction of the incident light. According to various exemplary aspects, the liquid interface may be altered using electric forces (e.g., electrokinetic and/or electrostatic forces) to move the liquid interface. Employing liquid optics to achieve light redirection according to various exemplary embodiments may substantially reduce wear of the device that may otherwise result from using moving, mechanical parts.

Figure 2:
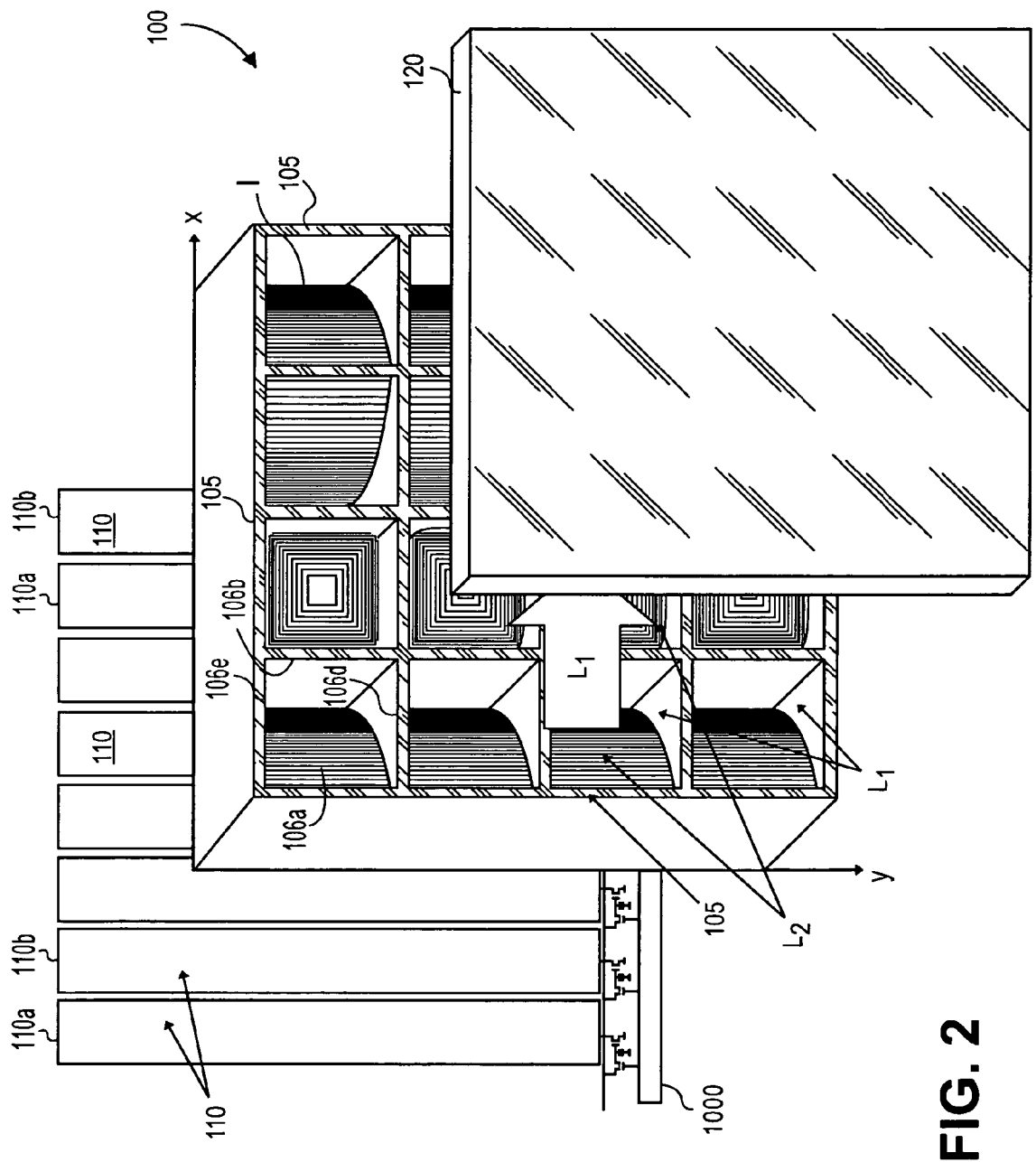
FIG. 2 is a partial, isometric view of an exemplary embodiment of the light redirection device of FIG. 1.

With reference to FIG. 1, a partial schematic side view of an exemplary embodiment of a light redirection device 100 positioned so as to receive incident light from an image display element 200 is illustrated. FIG. 2 illustrates an isometric perspective view of the light redirection device 100 of FIG. 1. The light redirection device 100 may comprise a plate-like structure defining a plurality of enclosures 105 (e.g., microenclosures) that range in size (e.g., area) from approximately a pixel to sub-pixel, for example from about 10 mm$^2$ to about 0.01 mm$^2$, and may be, for example, about 0.05 mm$^2$, and/or for example, about 1 mm$^2$ for a 1 m$^2$ display element. The plate-like structure may have overall dimensions corresponding substantially to the size of the image display element for which it is configured for use. Each enclosure 105 may have a substantially cube-like configuration and contain a first liquid L1 and a second liquid L2. The volume of each enclosure may range from about 30 mm$^3$ to about 0.001 mm$^3$, and may be, for example, about 0.015 mm$^3$. Those of ordinary skill in the art would recognize that the smaller the size of each enclosure 105, the more predominant capillary effects may become and the more complex manufacturing may be. The larger the size of each enclosure, the larger inertial effects, such as, for example, gravity, vibration, etc., may become. If larger enclosure sizes may be desirable, it may be possible to use a number of smaller enclosures in parallel.

A clear sheet 120 may be placed over the openings of the enclosures 105 so as to seal the liquids within the device 100. In order to allow for movement of the first liquid L1, the clear sheet 120 may be separated from the microenclosures, for example, by spacers. By way of example, spacers (not shown) may be placed every 20 to 50 pixels in both directions to maintain the sheet 120 at a distance ranging from about 1 mm to about 10 mm, for example about 3 mm to about 5 mm, from the enclosures 105. The spacers may also assist in hindering vibration of the sheet 120. A compatible sealant, such as sealants used with LCD panels, for example, may be used to seal the sheet 120 to the plane forming the enclosures 105 so as to seal the first liquid L1 therein. In an exemplary embodiment, the sealant may be provided around the edges of the sheet 120 and the plate forming the enclosures 105. Alternatively, multiple sealed chambers may be used with each chamber sealing one or a subset of enclosures 105.

The enclosures 105 may be formed in a transparent material that permits light to pass therethrough. According to an exemplary aspect, the enclosures 105 may be formed via etched depressions in the transparent material (such as, for example, glass or plastic) that are small enough to trap a small amount (e.g., droplet) of the second liquid L2 before being submerged in the first liquid L1. The first liquid L1 forms a reservoir between the surface of the second liquid L2 and the clear sheet 120, as indicated by the arrow labeled L1 in FIG. 2. In various exemplary embodiments, it may be possible to permit the first liquid L1 to flow in the space between the enclosures 105 and the clear sheet 120 so as to provide a cooling effect, for example, to dissipate heat from the image display element or other light source. Those having ordinary skill in the art would appreciate how to provide various flow control devices (e.g., piping, microfluidic valves and/or pumps, etc.) in conjunction with the light redirection device of FIGS. 1 and 2 in order to achieve such fluid circulation.

The materials used for the plate forming the enclosures 105 and the clear sheet 120 may be selected based on factors such as, for example, the type of fluids used in the enclosures 105 and/or desirable relative indices of refraction of each material and liquid through which light is being transmitted. Suitable materials for the enclosures 105 and the clear sheet 120 may include, but are not limited to, for example, silica-based glasses and transparent plastics, such as, for example, acrylics or polycarbonates. A transparent plastic may be used for the clear sheet 120 if the first liquid L1 is water. However, a plastic material may not be suitable for the clear sheet 120 or the enclosures 105 if the plastic material will be in contact with an oil. Supported glass may be particularly suitable for forming the enclosures 105 since such material is capable of supporting thin film transistor drivers, which are typically used to drive LCD panels.

A plurality of electrodes 110 may be positioned relative to the enclosures 105. The electrodes 110 may be independently controllable. According to various exemplary embodiments, the electrodes 110 may be substantially transparent and made for example, of indium tin oxide, or other suitable transparent electrode material. The electrodes 110 may be embedded, for example, by placing the electrodes 110 on a surface of the plate forming the enclosures 105 and then providing a transparent layer over the electrodes 110, or the electrodes 110 may be deposited on the surface of the plate-like structure forming the enclosures 105 (e.g., on the surface of the plate-like structure facing opposite the second liquid L2).

The first and second liquids L1 and L2 may be substantially transparent and substantially immiscible so as to form a liquid interface I. Moreover, the first and second liquids L1 and L2 may have differing indices of refraction and electrical properties. The first liquid L1 may be conductive and the second liquid L2 may be slightly conductive or nonconductive. In either case, however, the first liquid L1 may be substantially more conductive than the second liquid L2 and than the material from which the enclosures 105 are made from such that when the electrodes 110 are activated, an electric potential may be established between the first liquid L1 and the electrode 110 so as to cause the conductive liquid to move toward the activated electrode via electrostatic and/or electrokinetic forces, as will be described in more detail below. Thus, by utilizing electrostatic and/or electrokinetic principles, the liquid interface I in the enclosures 105 may be altered so as to alter a direction at which light passing through the enclosures 105 is transmitted. Examples of suitable liquids that may be used include, for example, water for the first liquid L1 and an oil for the second liquid L2. Those having ordinary skill in the art would understand how to select the liquids in each enclosure based on factors such as desirable light redirection, image quality, materials, etc.

In the absence of an electric potential being applied between the electrodes 110 and an enclosure 105 (e.g., if no voltage is applied to the electrodes 110 corresponding to an enclosure 105), the shape of the interface I between the first liquid L1 and the second liquid L2 is determined by the balance of surface tension forces of the liquids L1 and L2 and the interior surfaces 106a-106e of the enclosure 105. In this case, the light will not be redirected, although some slight spreading and/or focusing of the light may occur depending on the curvature of the interface.

Although the exemplary embodiments of light redirection devices shown in FIGS. 1-6 are described as using two liquids L1 and L2 to form the liquid prisms, a gas and at least one liquid also may be used for as long as the liquid does not evaporate into the gas. In such case, if, for example, L1 were replaced by a gas, the clear sheet 120 may be reconfigured so as to contact the plate-like structure forming the enclosures 105 so as to seal each enclosure 105 individually. Further, an additional electrode (e.g., an indium tin oxide (ITO) electrode) could be provided in the clear sheet 120 such that the external voltage is applied between that electrode and the electrodes 110 so as to cause movement of the liquid interface (e.g., the interface between the gas and the liquid L2.) If, on the other hand, the second liquid L2 were replaced by a gas, the first liquid L1 may need to be more insulative, rather than conductive. For example, the first liquid L1 may be a liquid having a relatively high permittivity. Again, the clear sheet 120 may be provided with a transparent electrode, such as ITO, and the voltage applied between that electrode and the electrodes 110. In this latter case, the electric force that ultimately causes movement of the liquid interface (e.g., the interface between the gas and the first liquid L1) may be an dielectrophoretic force.

In addition to a gas and a liquid being used, more than two liquids may be used for the liquid prisms. Thus, the term liquid prism may include a prismatic-like structure that comprises at least one liquid defining a liquid interface, with the liquid interface being any interface defined at least in part by a liquid. Thus, it also may be possible to provide a transparent, flexible, elastic membrane separating two liquids (e.g., the first liquid L1 and the second liquid L2) and/or separating a liquid and a gas, and thus defining the interface. Such membranes may be suitable in cases where the desired tilt angle of the interface, which is discussed further below, is relatively small.

Figure 3:
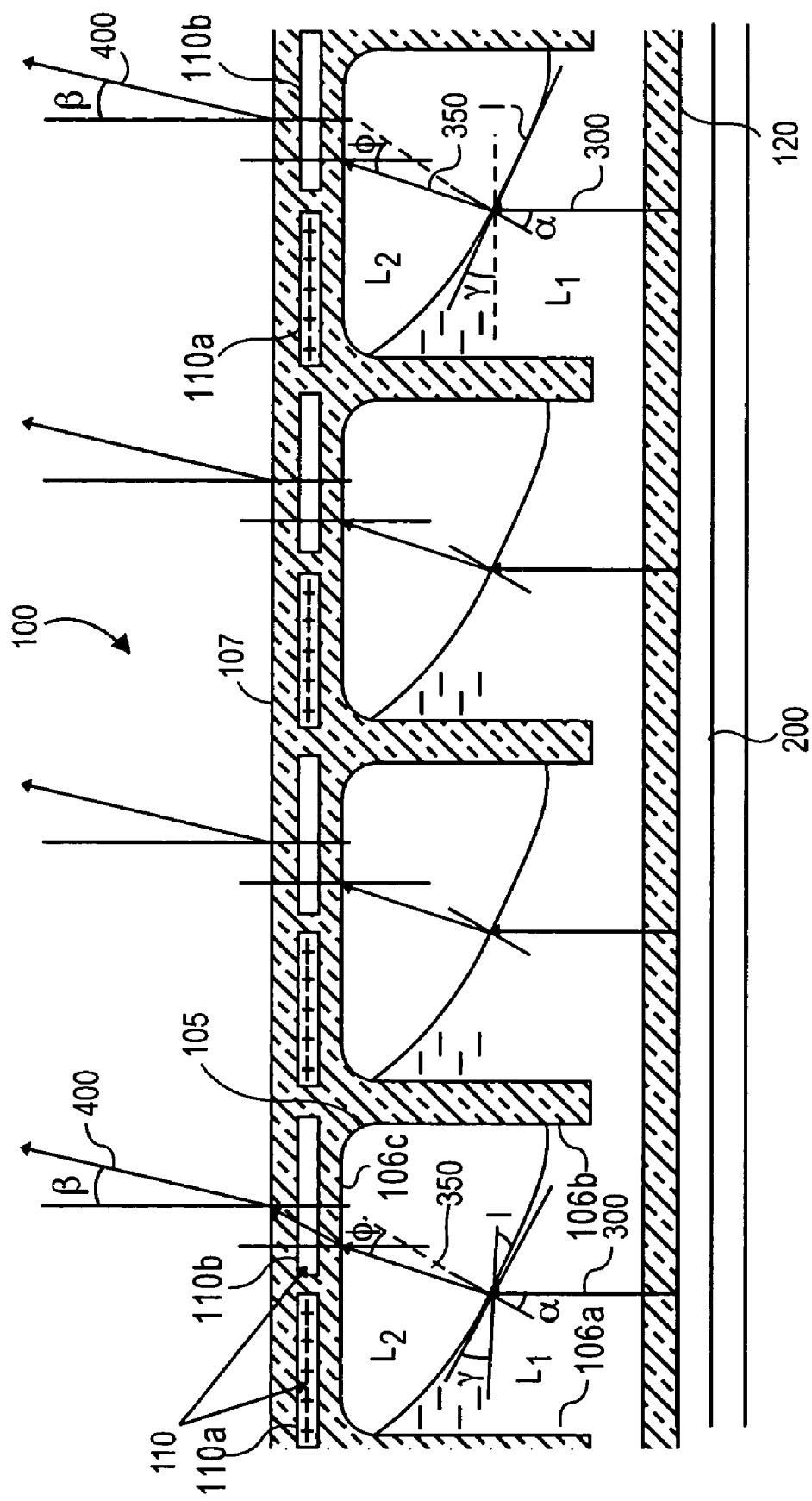
FIG. 3 is a partial, schematic side view of an exemplary embodiment of using the light redirection device of FIGS. 1 and 2.
Figure 4:
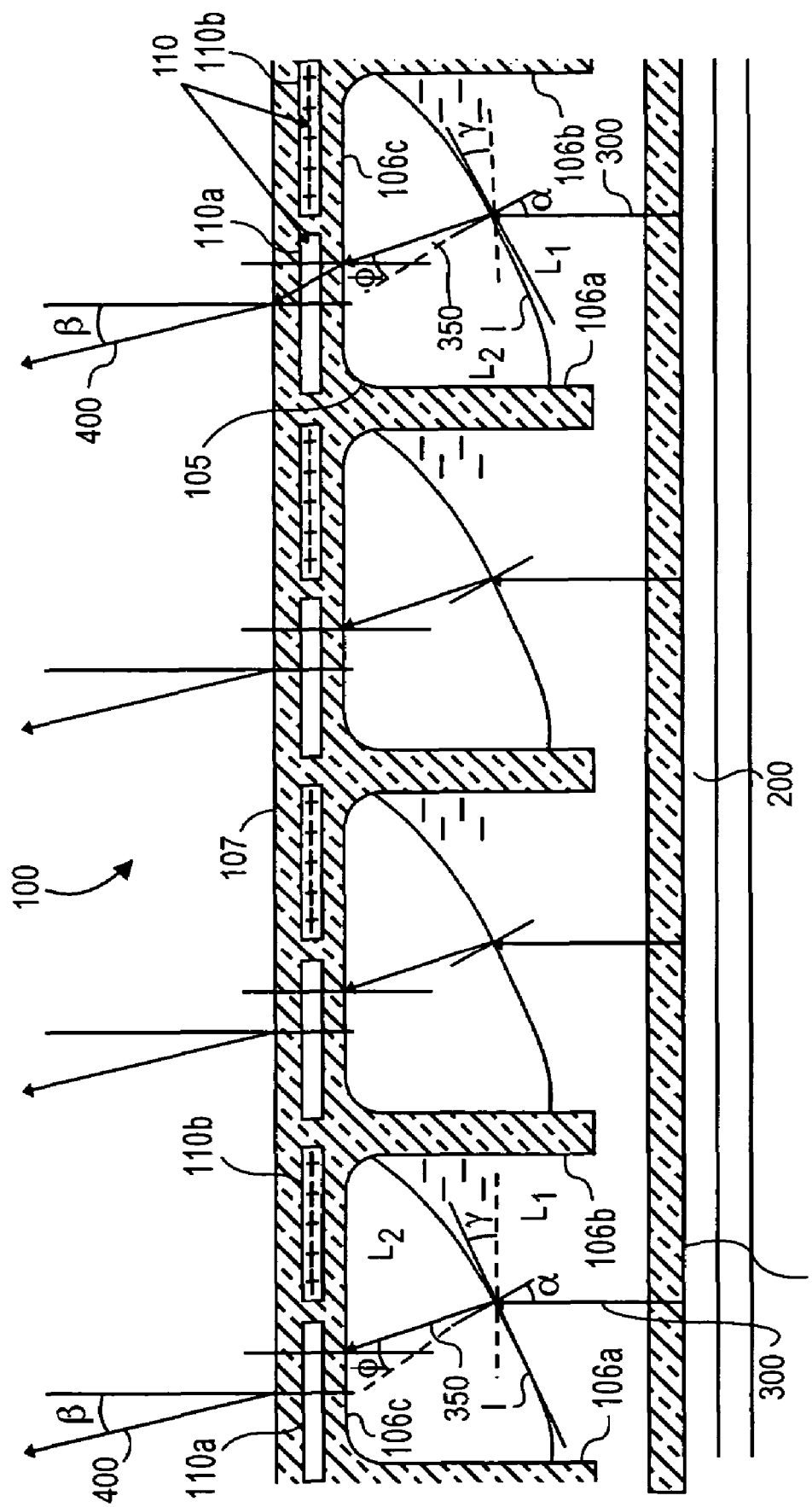
FIG. 4 is a partial, schematic side view of another exemplary embodiment of using of the light redirection device of FIGS. 1 and 2.
Figure 5:
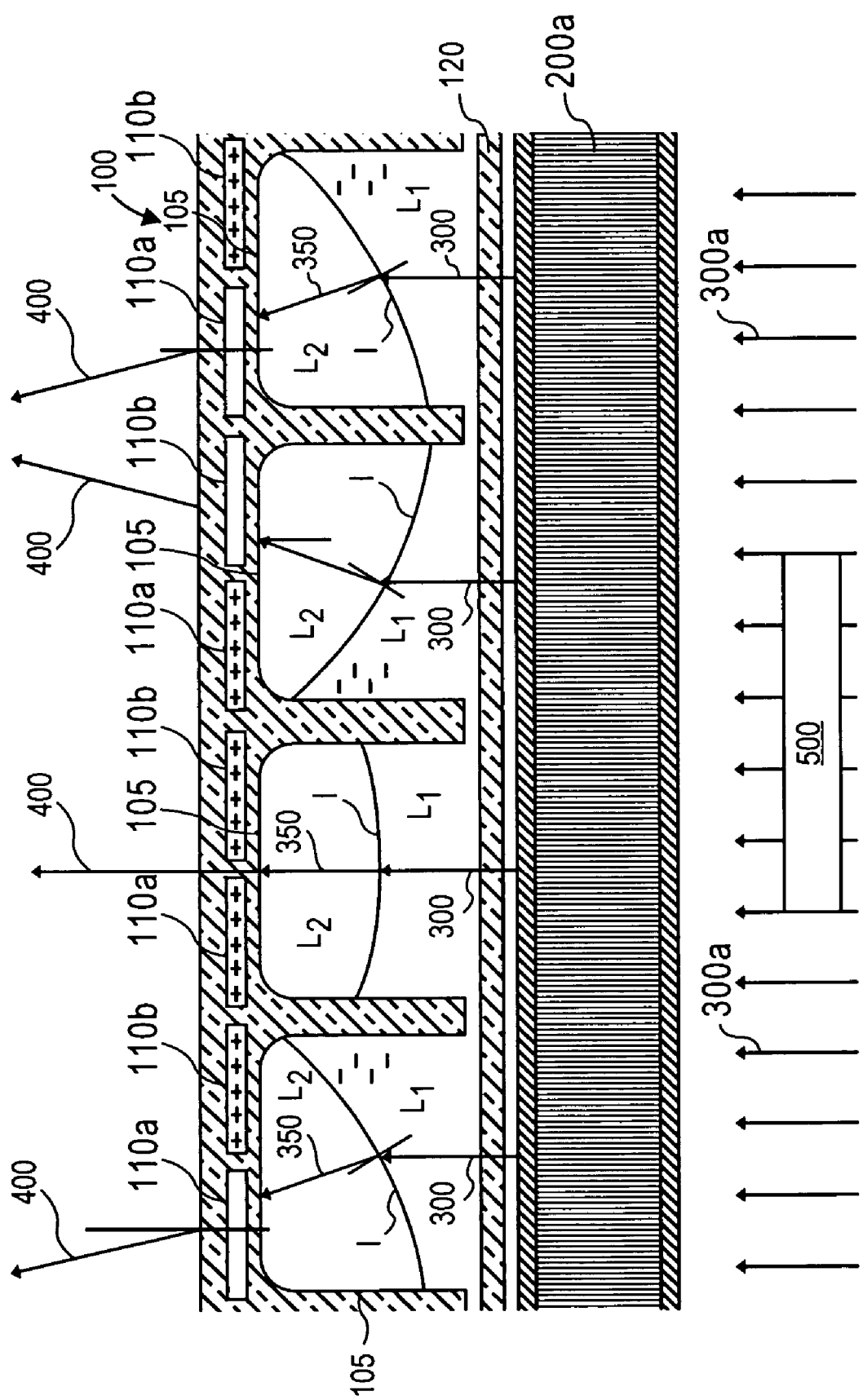
FIG. 5 is a partial, schematic side view of another exemplary embodiment of using the light redirection device of FIGS. 1 and 2.

FIGS. 3-5 show schematic illustrations of how the device 100 of FIG. 1 may be used to alter a direction at which light is transmitted relative to incident light 300 from the image display element 200 according to various exemplary aspects.

The electrodes 110 may be independently controlled, for example, by a controller 1000 shown in FIG. 2, so as to selectively apply a voltage to individual electrodes 110. Thus, as shown in the exemplary embodiment of FIG. 3, electrodes 110a positioned toward a left-hand side of each enclosure 105, as shown, may be activated, while electrodes 110b positioned toward a right-hand side of each enclosure 105 remain deactivated. When electrodes 110a are activated, as indicated by the plus symbols (+)in FIG. 3, an electric potential is established in each enclosure 105 between the first liquid L1, which is conductive, and the electrode 110a. This potential causes the first liquid L1 to move via electrostatic force toward the electrode 110a. In particular, the first liquid L1 tends to move up the lateral surface 106a of the enclosure 105 that is on the same side of the enclosure 105 as the activated electrode 110a. Movement of the first liquid L1 toward the activated electrode 110a in turn causes the interface I to move (e.g., tilt, skew, etc.), as shown in FIG. 3. In other words, in the arrangement illustrated in FIG. 3, the interface I may be tilted at a tilt angle γ relative to the substantially horizontal plane of the interface I in the absence of being tilted (e.g., as depicted in FIG. 1).

The movement of the first liquid L1 results in corresponding movement of the second liquid L2 such that the second liquid L2 forms a prismatic shape. The second liquid L2 may have a refraction coefficient that differs from (e.g, is higher than) the refraction coefficient of the first liquid L1. In this manner, an optical prism that redirects the incident light 300 is formed. That is, as illustrated in FIG. 3, when the incident light 300 reaches the interface I, the light is refracted by the second liquid L2 such that it is transmitted (as shown by arrow 350) at an angle φ relative to the normal of the interface I. The angle ϕ at which the light 350 is refracted is directly related to the tilt angle γ of the interface I, as is the angle β at which the light 400 leaves the structure forming the enclosure 105. The various angles at which the light is transmitted through each material (e.g., including the first liquid L1, second liquid L2, material of the enclosures 105) of the light redirection device 100 thus ultimately depend on the tilt angle γ, the various indices of refraction of the materials, and the angle of incidence α at which light enters the light redirection device. Those having ordinary skill in the art would understand how to determine the various angles at which light will be refracted through each material and ultimately transmitted from the device as 400.

Depending on the indices of refraction associated with the material in which the enclosures are formed and air, light 400 may be transmitted from the enclosures 105 and through the surface 107 above the enclosures 105 in a direction (e.g., at an angle β relative to the normal of the surface 107) that differs from the of angle of incidence α of the incoming light 300, but is related to the tilt angle γ. In either case, by altering the interface I, such as, for example, by altering the tilt angle γ of the interface I, the direction of the transmitted light 400 from the device 100 relative to the direction of the incident light 300 from the image display element 200 may be modulated as desired. In this way, an image generated by the image display element 200 may be projected in a direction that differs from the direction at which the image display element 200 projects the image in the absence of the redirection device 100.

FIG. 4 depicts use of the redirection device 100 to transmit light in a direction away from the direction at which the light is transmitted in FIG. 3, for example, toward the left side of the device shown in FIG. 4, as opposed to the right side. Thus, in FIG. 4, electrodes 110a are deactivated, while electrodes 110b, which are positioned toward the right side of the enclosures 105, are activated. Due to the effects of the electrostatic force, the first liquid L1 moves up the lateral interior surface 106b of the enclosure 105 toward the electrode 110b. The movement of the first liquid L1 toward the electrode 110b and the corresponding movement of the second liquid L2 in turn cause the interface I to tilt at an angle γ relative to the horizontal plane of the interface I in the absence of an the electrodes 110 being activated, as shown in FIG. 1.

As described above, with reference to FIG. 3, if the second liquid L2 has a refraction coefficient that differs from (e.g., is higher than) the refraction coefficient of the first liquid L1, the second liquid L2 acts like an optical prism that redirects (e.g, refracts) the incident light 300. Thus, as illustrated in FIG. 4, and in a manner similar to that described above with reference to FIG. 3, when the incident light 300 reaches the interface I at incident angle α, the light is refracted by the second liquid L2 such that it is transmitted at an angle ϕ, as shown by arrow 350. The angle ϕ is directly related to the tilt angle γ of the interface I. Depending on the indices of refraction associated with the enclosure material and air, light 400 may be transmitted from the enclosures 105 and through the surface 107 above the enclosures 105 at a direction (e.g., at an angle β) that differs from the incident angle α, but is related to the tilt angle γ. In either case, an image generated by the image display element 200 may be projected in a direction that differs from the direction at which the image display element 200 projects the image in the absence of the redirection device 100. And by controlling which electrodes 110 are activated, as well as the strength of the electric potential (e.g., the amount of voltage applied to the electrodes), the image may be selectively redirected at a desired angle.

As can be seen from FIGS. 3 and 4 and the above description of those figures, the light redirection device 100 may be used to modulate the direction at which incident light from the image display element 200 is transmitted so as to control the direction at which an image is projected. By controlling which, if any, of electrodes 110 are activated, the image from the image display element 200 may thus be redirected via the redirection device 100 toward a right side (FIG. 3), a left side (FIG. 4), or in substantially the same direction (FIG. 1) of the normal to the image display element 200. Thus, the light redirection device 100 may be used to redirect incident light from the image display element 200 so as to project an image in a direction toward an observer situated at an off-normal axis angle to the image display element 200.

The degree of tilting of the interface I, and thus the direction at which an image is projected, may be controlled as desired by altering factors such as, for example, the dielectric characteristics of the material from which the enclosures 105 are made, the voltage applied to the electrodes 110, and the types of liquids L1 and L2 (or gas and liquid) provided in the enclosures. Further, it is envisioned that for a given enclosure material and given liquid or gas types, the degree and/or the direction of tilt of the interface I may be selectively modulated by adjusting the strength of the electric potential between the electrodes 110 and the liquid L1 (e.g., the amount of voltage applied to the electrodes 110) and/or by selecting which electrodes 110 are activated.

As discussed above, the electrodes 110 may be configured so as to be independently activated and controlled. According to various exemplary aspects, differing electrodes 110 corresponding to differing regions of the image display element 200 may be activated. In this way, images corresponding to differing regions of the image display element 200 may be projected in differing directions. By way of example only, FIG. 5 illustrates use of a light redirection device 100 for redirecting light received from a LCD element 200a that is lit from light 300a generated from a backlight system 500, although it should be understood that the light redirection device 100 may be used with any type of image display element and use of a backlit LCD panel is exemplary only. In this exemplary embodiment, the interfaces I corresponding to the two enclosures 105 on the far left hand side and far right hand side of the redirection device 100 may be tilted toward the left by activating electrodes 110b corresponding to those enclosures. The interface I corresponding to the enclosure 105 situated adjacent to the far right enclosure may be tilted toward the right by activating electrode 110a, and the interface I corresponding to the enclosure 105 situated adjacent to the far left enclosure may remain substantially untilted by activating either both of the electrodes 110a and 110b corresponding to that enclosure, as illustrated, or neither of the electrodes 110a and 110b corresponding to that enclosure. In such an arrangement of the interfaces I, an image generated by a region of the LCD panel 200a substantially corresponding to the far left enclosure and far right enclosure may be projected toward a left side, as shown by transmitted light 400. An image generated by a region of the LCD panel 200a substantially corresponding to the enclosure 105 situated adjacent to the far right enclosure 105 may be directed toward the right side, and an image generated by a region of the LCD panel 200a substantially corresponding to the enclosure 105 situated adjacent the far left enclosure 105 may be projected in a direction substantially the same as the direction at which the image is projected from the LCD panel (as shown by incident light 300 in FIG. 5).

Thus, it can be seen from FIG. 5 that the various electrodes may be individually controlled so as to achieve various tilt angles of the interfaces of each enclosure and redirection of the light, and thus projection of images, in a variety of differing directions. The ability to project images corresponding to differing regions of an image display element in differing directions may have useful applications in settings where more than one observer, for example, observers situated at differing angles relative to the display element. Those skilled in the art would understand from the teachings herein how to control which electrodes are activated and the strength of those electrodes in order to alter the liquid interfaces I and achieve redirection of incident light in various directions within one light redirection device.

According to various exemplary embodiments, it may be useful to project an image from a first half of a display element toward one direction and an image from a second half of a display element toward another, substantially opposite direction. For example, the interfaces I of the enclosures 105 corresponding to a left half of the display element may be tilted toward the left so as to project an image generated by the left half of the display element toward the left, and the interfaces of the enclosures 105 corresponding to a right half of the display element may be tilted toward the right so as to project an image generated by a right half of the display element toward the right. Redirecting the images in this manner may be useful in settings in which observers situated to opposite sides of the normal axis to the image display element may need to view images generated by the image display element.

Moreover, it should be understood that by orienting the electrodes 110 horizontally (e.g., in rows instead of columns as shown in FIG. 2), and controlling the electrodes 110 accordingly, the interface I may be tilted upward or downward instead of left or right. Such a configuration may permit redirection of the image vertically (e.g., up or down) with respect to the normal axis of the image display element.

According to various exemplary embodiments, a light redirection device may be configured so as to permit redirection of incident light in two dimensions. FIGS. 6A-6F schematically depict an exemplary embodiment of how the enclosures and electrodes corresponding to the enclosures of a light redirection device may be configured so as to achieve redirection of light in two dimensions. As with the embodiments of FIGS. 1-5, the light redirection device may comprise a plurality of enclosures (e.g., microenclosures) 605 containing a first liquid L1 (which is illustrated by no shading) and a second liquid L2 (which is illustrated by dark shading) similar to the enclosures 105 and may have a similar structure described above with reference to the embodiments of FIGS. 1-5 with the exception of the arrangement and number of electrodes associated with each enclosure. Referring to FIG. 6*a*, which for the sake of simplicity depicts only a single enclosure 605, the light redirection device comprises four electrodes 610*a*-610*d* associated with each enclosure 605. Such an electrode configuration may permit light, and thus an image, from an image display element (not shown) to be redirected in two dimensions, for example, toward the left, right, up, or down relative to the normal axis of the image display element, as described below with reference to FIG. 6B-6F.

In FIG. 6B, again for the sake of simplicity, the electrodes 610*a*-610*d* are shown by the four squares depicted at the bottom of each enclosure 605, with a plus symbol (+) to indicate the electrode is activated or a zero symbol (0) to indicate the electrode is not activated. It should be understood, however, that the electrodes 610*a*-610*d* are actually located relative to the enclosure 605 as is shown in FIG. 6A. Referring to FIG. 6B, to transmit light from the enclosure 605 in a direction substantially the same as the direction of the incident light, all of the electrodes 610*a*-610*d* may be activated so as to achieve a substantially flat interface I between the first liquid L1 and the second liquid L2. It also may be possible to achieve a flat interface I by not activating any of the four electrodes 610*a*-610*d* associated with the enclosure 604. To redirect light to the right hand side of the drawing sheet, electrodes 610*a* and 610*c* may be activated, as shown in FIG. 6C, while the remaining electrodes 610*b* and 610*d* remain deactivated so as to cause the first liquid L1 to move up the left hand surface of the enclosure 605 and the interface I to tilt toward the right. To redirect light to the left hand side of the drawing sheet, electrodes 610*b* and 610*d* may be activated while the remaining electrodes 610*a* and 610*c* remain deactivated, as shown in FIG. 6D, thereby causing the interface I to tilt toward the left. As shown in FIG. 6E, to redirect light in an upward direction, electrodes 610*c* and 610*d* may be activated while electrodes 610*a* and 610*b* remain deactivated, causing the interface I to tilt upward. As shown in FIG. 6F, to redirect light in a downward direction, electrodes 610*a* and 610*b* may be activated while electrodes 610*c* and 610*d* remain deactivated, causing the interface I to tilt downward. Other combinations of activating one or more electrodes 610*a*-610*d* would be obvious to those with skill in the art in order to achieve other alterations (e.g., including shape and/or tilt angle) of the interface I and other light redirection effects.

Although the exemplary embodiments depicted herein show use of two electrodes and four electrodes being associated with each enclosure, it is envisioned that any number of electrodes may be associated with each enclosure. The number of electrodes associated with each enclosure may be selected based on, for example, the desired alteration of the liquid interface in each enclosure and/or the desired redirection of the light from an image display element. By way of example only, a fifth electrode may be placed in the center of the four electrodes 610*a*-610*d* illustrated in the exemplary embodiment of FIGS. 6A-6F, and may be used to flatten out the interface I (e.g., make the interface less concave or convex), for example when it is in a tilted configuration. Those having skill in the art would understand that by increasing the number of electrodes acting on the liquid within an enclosure, greater control over the alteration of the interface configuration may be obtained.

Moreover, although in the exemplary embodiments depicted herein, alteration of the liquid interface includes tilting and/or skewing the liquid interface, it is envisioned that the liquid interface may be altered in a variety of ways, including, but not limited to, for example, deforming, altering a concavity of the interface, altering a convexity of the interface, and/or otherwise moving and/or imparting differing configurations to the interface.

Figure 7:
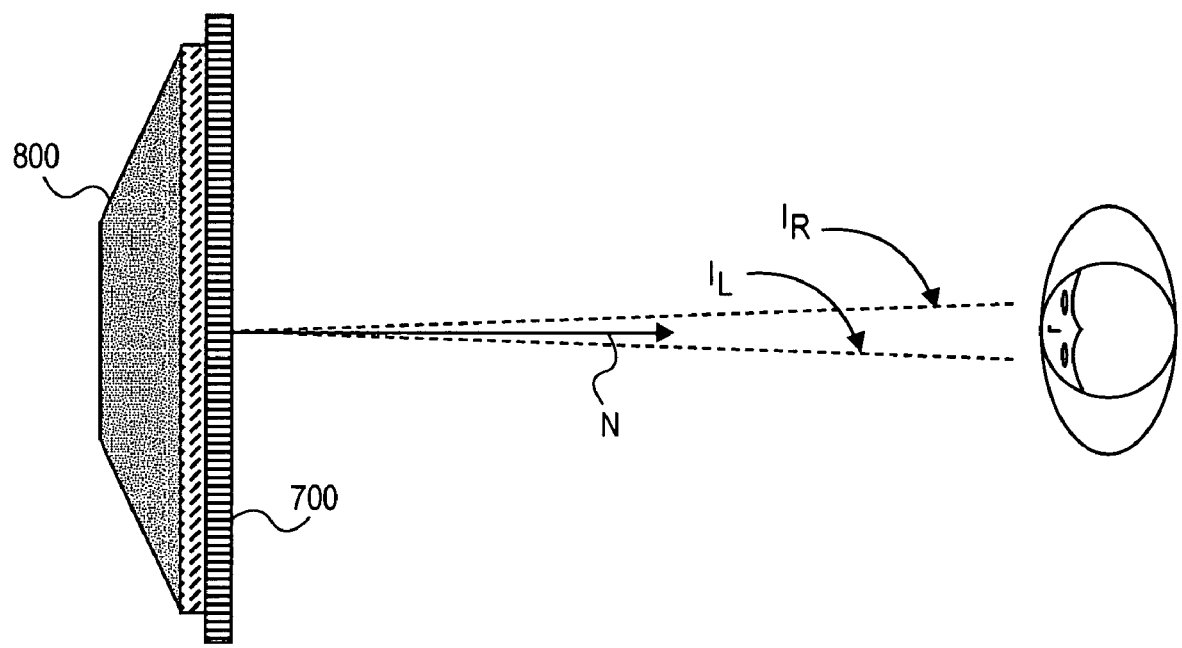
FIG. 7 is a side perspective view of another exemplary embodiment of use of a light redirection device.

According to yet further exemplary embodiments, light redirection devices as described herein may be used to project a three-dimensional image to a viewer of an image display element. By way of example, with reference to FIG. 7, using a light redirection device 700 according to exemplary embodiments, a portion of an image from an image display element 800 could be redirected toward a left hand side of the display element and another portion could be redirected toward a right hand side of the display element. As depicted in FIG. 7, for a viewer viewing the images substantially from a center (e.g., from a direction substantially along the normal axis N of the display element 800), a first image $I_R$ may be viewed by the viewer's right eye and a second image $I_L$ may be viewed by the viewer's left eye. Such viewing of slightly different images taken from slightly different angles by the viewer's right and left eyes may result in the image being perceived by the viewer as three-dimensional.

According to various exemplary embodiments, the light redirection devices and methods according to aspects of the invention may be programmable such that the appropriate electrodes are automatically activated and/or controlled (e.g., in terms of strength of electric potential) to achieve a desired redirection of the light. For example, the light redirection devices and methods may be configured so as to permit differing users of the device (e.g., observers viewing images from an image display panel) to set a desired redirection angle. Once set, the redirection device may be programmed and controlled automatically so as to activate electrodes in a manner such that the redirection angle associated with the observer is obtained. In an exemplary aspect, a key pad, keyboard, or the like, may be used in conjunction with a controller in communication with the light redirection device. Each observer may be associated with a numbered button or the like from a series of buttons, for example, numbered 1, 2, 3, . . . , etc. and/or each observer may be associated with a unique code, for example, an alphanumeric code. Once the desired redirection angle is programmed to be associated with a particular button and/or code, the observer may press the appropriate button or code, which in turn will control the appropriate electrodes (including which electrodes are activated and the strength of the actuated electrodes, for example) so as to cause the redirection device to project the image from an image display element at the angle associated with that button and/or code.

The light redirection devices according to various exemplary embodiments may be stand-alone device comprising their own drive electronics and configured to be placed over an image display element, for example, in manner similar to privacy filters, glare screens, and the like. Alternatively, light redirection device according to various exemplary embodiments may be made as an integral part of the image display element.

It should be understood that sizes, configurations, numbers, and positioning of various structural parts and materials used to make the above-mentioned parts are illustrative and exemplary only. One of ordinary skill in the art would recognize that those sizes, configurations, numbers, positioning, materials, and/or other parameters can be changed to produce different effects, desired characteristics, and/or to achieve different applications than those exemplified herein. By way of example, it is envisioned that the light redirection devices may comprise various configurations of liquid prisms aside from those configurations disclosed with reference to the exemplary embodiments. Thus, liquid prisms may comprise a single liquid or a plurality of liquids defining one or more interfaces that may be alterable as desired via electric forces, including, for example, by electrostatic, electrokinetic, and/or electrowetting, and/or other techniques for altering the interface. Moreover, those of skill in the art would recognize that selectively modulatable light redirection devices may comprise tunable optical components other than liquid prisms.

Moreover, although various embodiments of light redirection devices and methods have been disclosed in conjunction with use in an airplane cockpit, a military vehicle, and automobiles to redirect images from an image display element, those having ordinary skill in the art would understand other applications for which the light redirections devices and methods may be useful. Such applications may include, but are not limited to, for example, redirecting images from televisions, monitors, signs, and/or other video or display components.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations. Other embodiments of the invention will be apparent to those skilled in the art from consideration of the specification and practice of the invention disclosed herein.

What is claimed is:

1. A device for redirecting light, the device comprising:
   a plate-like structure comprising a plurality of enclosures;
   a plurality of liquid prisms, each being located within one of the plurality of enclosures and configured to transmit incident light from an image display element, and
   a plurality of electrodes coupled to the plate-like structure such that at least a portion of the transmitted incident light impinges upon at least some of the electrodes,
   wherein the liquid prisms and the electrodes are configured to selectively modulate substantially all of the light transmitted through a first of the liquid prisms in a first direction relative to the incident light and selectively modulate all of the light transmitted through a second of the liquid prisms in a second direction relative to the incident light, the second direction of modulation substantially opposing the first direction of modulation.

2. The device of claim 1, wherein the plurality of liquid prisms are configured to transmit incident light from an image display element chosen from liquid crystal display elements, plasma display elements, cathode ray tube display elements, projection type display elements, light emitting diodes, and organic light emitting diodes.

3. The device of claim 1, wherein the plurality of liquid prisms are configured to selectively modulate the direction at which light is transmitted relative to the direction of incident light via an electric force.

4. The device of claim 1, wherein each of the plurality of liquid prisms comprises a liquid interface through which the light is transmitted, and wherein the plurality of liquid prisms are configured to selectively modulate a direction at which the light is transmitted by altering the liquid interfaces.

5. The device of claim 1, wherein each of the plurality of liquid prisms comprises at least one liquid and the electrodes are substantially transparent.

6. The device of claim 5, wherein the plate-like structure further comprises a substrate and a plurality of walls extending from the substrate, the substrate and the plurality of walls jointly forming the plurality of enclosures, and wherein the plurality of electrodes are located within the substrate.

7. The device of claim 6, wherein the at least one liquid comprises a first liquid and a second liquid defining a liquid interface, the interface being alterable in response to voltage selectively applied to the electrodes.

8. The device of claim 7, wherein the plurality of electrodes are configured so as to alter the interface such that a direction of the transmitted light relative to the incident light is selectively modulatable in two dimensions.

9. The device of claim 1, wherein the liquid prisms are configured to selectively modulate the direction of the transmitted light relative to the incident light in two dimensions.

10. The device of claim 1, wherein the plurality of liquid prisms are configured to selectively modulate the direction at which light is transmitted relative to a direction of the incident light such that an image generated by a first portion of the image display element is projected in a first direction and an image generated by a second portion of the image display element is projected in a second direction that differs from the first direction.

11. The device of claim 1, wherein the plurality of liquid prisms are configured to selectively modulate the direction at which light is transmitted relative to a direction of the incident light such that an image generated by the image display element is projected as a three-dimensional image.

12. A display system comprising:
an image display element; and
a device for redirecting light from the image display element, the device comprising
a plate-like structure comprising a plurality of enclosures;
a plurality of liquid prisms, each being located within one of the plurality of enclosures and configured to transmit the light from the image display element, and
a plurality of substantially transparent electrodes coupled to the plate-like structure such that at least some of the transmitted light from the image display device impinges at least some of the electrodes,
wherein the liquid prisms and the electrodes are configured to selectively modulate—a direction of the transmitted light relative to the incident light such that substantially all of the light transmitted through a first of the liquid prisms is projected in a first direction relative to the incident light and substantially all of the light transmitted through a second of the liquid prisms is projected in a second direction relative to the incident light, the second direction substantially opposing the first direction.

13. The display system of claim 12, wherein the image display element is chosen from liquid crystal display elements, plasma display elements, cathode ray tube display elements, projection type display elements, light emitting diodes, and organic light emitting diodes and the plate-like structure further comprises a substrate and a plurality of walls extending from the substrate, the substrate and the plurality of walls jointly forming the plurality of enclosures, and wherein the plurality of electrodes are located within the substrate

14. A method for redirecting light, the method comprising:
transmitting incident light from an image display element through a device for redirecting light comprising a plurality of liquid prisms and a plurality of substantially transparent electrodes coupled to the plurality of liquid prisms such that at least some of the transmitted incident light propagates through at least some of the electrodes; and
selectively modulating a direction of the transmitted light relative to the incident light with the plurality of liquid prisms and the plurality of substantially transparent electrodes such that substantially all of the light transmitted through a first of the liquid prisms is projected in a first direction relative to the incident light and substantially all of the light transmitted through a second of the liquid prisms is projected in a second direction relative to the incident light, the second direction substantially opposing the first direction.

15. The method of claim 14, wherein the transmitting incident light comprises transmitting light from an image display element chosen from liquid crystal display elements, plasma display elements, cathode ray tube display elements, projection type display elements, light emitting diodes, and organic light emitting diodes.

16. The method of claim 14, wherein selectively modulating the direction of the transmitted light comprises selectively modulating the direction of the transmitted light via an electric force.

17. The method of claim 14, wherein each of the plurality of liquid prisms at least one liquid, the device for redirecting light further comprises a substrate and a plurality of walls extending from the substrate, the substrate and the plurality of walls jointly forming a plurality of enclosures, each of the liquid prisms being located within one of the of enclosures and each of the electrodes being located within the substrate, and wherein the transmitting incident light comprises transmitting incident light through the enclosures.

18. The method of claim 17, wherein the at least one liquid comprises a first liquid and a second liquid, and wherein transmitting the incident light through the enclosures comprises transmitting the incident light through a first liquid and a second liquid defining a liquid interface.

19. The method of claim 18, wherein selectively modulating the direction of the transmitted light comprises altering the interface.

20. The method of claim 19, wherein altering the interface comprises selectively applying voltage to at least one of a plurality of electrodes.

21. The method of claim 19, wherein altering the interface comprises altering the interface such that a direction of the transmitted light relative to the incident light is selectively modulatable in two dimensions.

22. The method of claim 19, wherein altering the interface comprises selectively moving at least one of the first liquid and the second liquid via an electric force.

23. The method of claim 14, wherein selectively modulating a direction of the transmitted light relative to the incident light comprises selectively modulating the direction of the transmitted light in two dimensions.

24. The method of claim 14, wherein the selectively modulating comprises selectively modulating the direction at which light is transmitted relative to a direction of the incident light so as to project an image generated by a first portion of the image display element in a first direction and project an image generated by a second portion of the image display element in a second direction that differs from the first direction.

25. The method of claim 14, wherein the selectively modulating comprises selectively modulating the direction at which light is transmitted relative to a direction of the incident light so as to project an image generated by the image display element as a three-dimensional image.

\* \* \* \* \*